(12) United States Patent
Wingett et al.

(10) Patent No.: US 7,183,536 B2
(45) Date of Patent: Feb. 27, 2007

(54) MOTION ENCODER

(75) Inventors: Gary Wingett, Hampshire (GB);
Andrew Raymond Bick, Surrey (GB);
Maysara Fermawi, London (GB)

(73) Assignee: Nokia Corporation, Espoo (FI)

( * ) Notice: Subject to any disclaimer, the term of this patent is extended or adjusted under 35 U.S.C. 154(b) by 48 days.

(21) Appl. No.: 10/632,359

(22) Filed: Aug. 1, 2003

(65) Prior Publication Data

US 2004/0118998 A1    Jun. 24, 2004

(30) Foreign Application Priority Data

Dec. 19, 2002    (GB)    ................... 0229620.0

(51) Int. Cl.
*G01D 5/34*    (2006.01)
(52) U.S. Cl. .................... 250/231.13; 341/13
(58) Field of Classification Search .......... 250/231.13, 250/231.14, 231.17, 231.18, 237 R, 237 G; 345/165, 166; 341/13, 31
See application file for complete search history.

(56) References Cited

U.S. PATENT DOCUMENTS 4,993,659 A * 2/1991 Takai et al. ............ 250/231.13
5,243,187 A    9/1993 Hettlage ................ 250/231.16
5,748,181 A * 5/1998 Fu et al. ................ 250/231.18
6,351,657 B2 * 2/2002 Yamada ..................... 455/566
2002/0005820 A1 * 1/2002 Son et al. ....................... 345/8

FOREIGN PATENT DOCUMENTS

| EP | 0096476 A2 |   | 12/1983 |
| EP | 0210825 A2 |   | 2/1987 |
| EP | 0901262 A2 |   | 3/1999 |
| GB | 2297840 A |   | 8/1996 |
| JP | 08029202 A | * | 2/1996 |

OTHER PUBLICATIONS

Patent Abstracts of Japan; "Rotary Encoder"; Pub. No. 08029202, Pub. Date Feb. 2, 1996.

* cited by examiner

*Primary Examiner*—Kevin Pyo
(74) *Attorney, Agent, or Firm*—Harrington & Smith, PC

(57) ABSTRACT

A motion encoder for use with a rotating key. The motion encoder allows the direction of rotation to be determined by providing elements having different characteristics for the transmission of a IR beam. These elements are arranged in a pattern that allows an IR beam impinging on the elements to trace a path detected as the rotating key turns. The beam being detected after changes in the reflected or transmitted beam indicating the direction of rotation of the beam.

24 Claims, 3 Drawing Sheets

MOTION ENCODER

FIELD OF THE INVENTION

The invention relates to an electromagnetic motion encoder. In particular it relates to the translation of movement information into an analogue output representation.

BACKGROUND OF THE INVENTION

A radiotelephone normally comprises a screen and an alphanumeric keypad where a user may input information to the radiotelephone using the alphanumeric keypad and simultaneously display that information on the screen. The size of the radiotelephone is primarily limited by the size of the screen and alphanumeric keypad. It is desirable for the radiotelephone to be compact so that the user may place the radiotelephone in a pocket. While both the screen and the keypad may be reduced in size, the screen must be large enough so that characters displayed on it are large enough to be read by the user. The alpha numeric keypad must be large enough so that the user is able to input data without inadvertently activating two keys at the same time.

It is a desirable feature of a radio telephone that the screen is large enough to recognise the data which has been input by the user with the alphanumeric keypad and to allow the user to use other applications on the radio telephone, the playing of games being one such application. It is therefore undesirable that the screen size be reduced. The dimensions of a radiotelephone are limited by the screen and keypad unless an alternative form of user input to replace the alphanumeric keypad is made available.

The Nokia 7110 included a roller key described in UK patent EP0901262. The rotational movement of the key was detected using a mechanical conductive switch which added to the dimension requirements of the device.

SUMMARY OF THE INVENTION

In accordance with the present invention there is provided a motion encoder for determining rotational movement of a rotatable member comprising an element providing areas having respectively different characteristics for the onward transmission of electromagnetic radiation, the areas being arranged to provide a directionally unique sequence of transmission characteristics along a path traced on rotation of the rotatable element.

By providing areas having a sequence of transmission characteristics along a path traced when the rotatable element turns, a source of electromagnetic radiation can be provided that traces that path and by detecting the change in intensity of radiation at a detector located to receive the radiation after it has been altered by interaction with the respective areas as the rotatable member turns, the direction of rotation can be determined. By suitable choice of the extent of the areas along the traced path, the speed and/or angle of rotation can also be determined.

The motion encoder itself may include the source of electromagnetic radiation and a suitable detector. One such suitable source may be an infrared beam although a beam in the visible spectrum or other beams could be used instead.

The characteristics of the respective areas may be reflection, absorption, polarisation or the like. The particulars of the characteristics may influence the location of the detector.

One way in which the areas can be arranged to provide a sequence that differs depending on the direction of rotation of the rotatable element is to provide areas having respectively three different characteristics and placing a first of the three areas followed by a second of the three followed by a third of the three, in the same repeating pattern along the traced path. The areas may be similar in extent. Other coding schemes for the arrangement of the areas will be apparent to the skilled man.

The areas having different characteristics may be reflective surfaces having differing degrees of absorption to the electromagnetic signal, for example by reflecting different proportions or all of the transmitted signal back to the detector. The transmitter and receiver units may be fixed with reference to an axis about which the rotatable element rotates. The reflecting surfaces may be symmetrical about the axis of rotation. The reflecting surfaces may be perpendicular to the axis of rotation.

To provide information to a processor, the electromagnetic motion encoder translates the movement and direction information into an analogue output representation. The receiver unit or detector may be configured such that the analogue output representation is a voltage, which is proportional to the amount of reflected signal.

In a preferred embodiment the rotating member is a rotary dial on an electronic device, for example a wireless communications device such as a radiotelephone or hand portable telephone, the upper surface of which is visible to the user appearing alone or as part of a keypad arrangement in keeping with the design of the radiotelephone. The axis upon which the rotary dial revolves may provide longitudinal or pivotal movement in order to provide alternative functionality for the dial. Rotation of the dial may correspond to movement of a cursor or the like on the screen of the radiotelephone.

An advantage of the present invention is that it allows the alphanumeric keypad to be totally or partially replaced with an electromagnetic encoder; the size of the electromagnetic encoder and rotary dial requiring a smaller surface area than the alphanumeric keypad. In the preferred embodiment the use of a rotary dial allows the user to select menu choices displayed on the screen and to input data by scrolling through an alphanumeric list. The use of the, for example, three or more reflective surfaces in a repetitive sequence also enables the orientation of rotation to be determined allowing the user to select menu choices by either scrolling up or down a menu list. The use of three or more reflective surfaces allows the use of a single transmitter and receiver module for determining the direction of rotation. The use of a rotary dial with the electromagnetic encoder also allows the user input means to be low profile and suitable for implementation within a radiotelephone.

BRIEF DESCRIPTION OF THE DRAWINGS

Embodiments of the invention will now be described in greater detail with reference to the drawings of which.

DETAILED DESCRIPTION OF THE INVENTION

Figure 1:
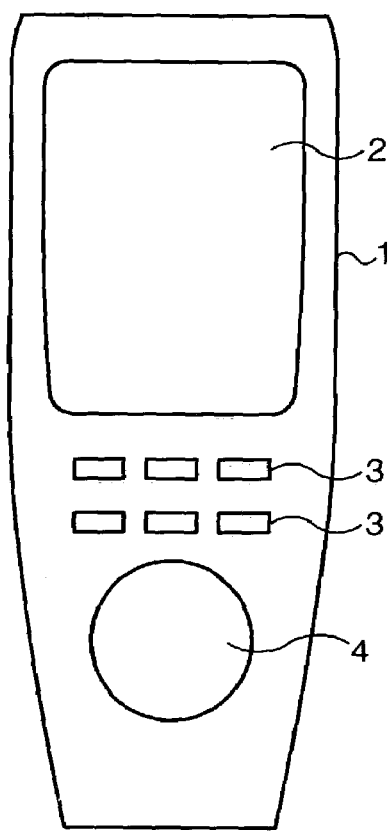
FIG. 1 shows a radiotelephone having a rotary dial.

With reference to FIG. 1, a radiotelephone 1 is illustrated that includes radio reception and transmission means contained substantially within the casing of the radiotelephone 1, a LCD 2 and a plurality of keys 3. The plurality of keys 3 are positioned below the LCD 2. Said LCD 2 and the plurality of keys 3 are positioned on the front surface of a radiotelephone 1. Also featured is a rotary dial 4, which is positioned below the plurality of keys 3. The rotary dial 4 is mounted so that its axis of rotation is perpendicular to the front surface of the radiotelephone 1. The rotary dial 4 forming part of an electromagnetic encoder solution for the translation of movement into an analogue output representation. In one embodiment the electromagnetic encoder is an optical encoder.

Figure 2:
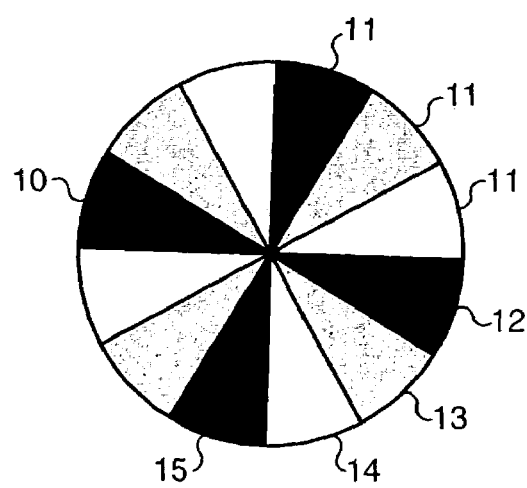
FIG. 2 shows a rear surface of the rotary dial illustrating an embodiment having three reflective surfaces.

With reference to FIG. 2, a disc 10 that includes three different reflective surfaces 11; more of course could be used, organised such that each reflective surface forms a sector on the disc 10. The reflective surfaces 11 are organised such that the reflective surfaces 11 form a repetitive sequence. Referring to FIG. 2 the reflective surfaces are organised such that there is a very reflective surface 12 which is adjacent to a partially reflective surface 13 which is adjacent to a non-reflective surface 14 which is adjacent to a very reflective surface 15. This pattern is repeated around the whole surface of the disc. In this embodiment the reflective surfaces 11 of the disc 10 are constructed so as to reflect varying amounts of a transmitted frequency, for example, infrared which is incident upon the reflective surface. The transmitted frequency may take the form of a beam directed on the disc; a suitable transmitted frequency being IR. In this embodiment this surface forms the reverse surface of a rotary dial 4. As the disc moves relative to the beam as the dial rotates, the beam traces a path across the sectors. The surface of the disc 10 forming part of an electromagnetic encoder solution for the translation of movement into an analogue output representation.

Figure 3:
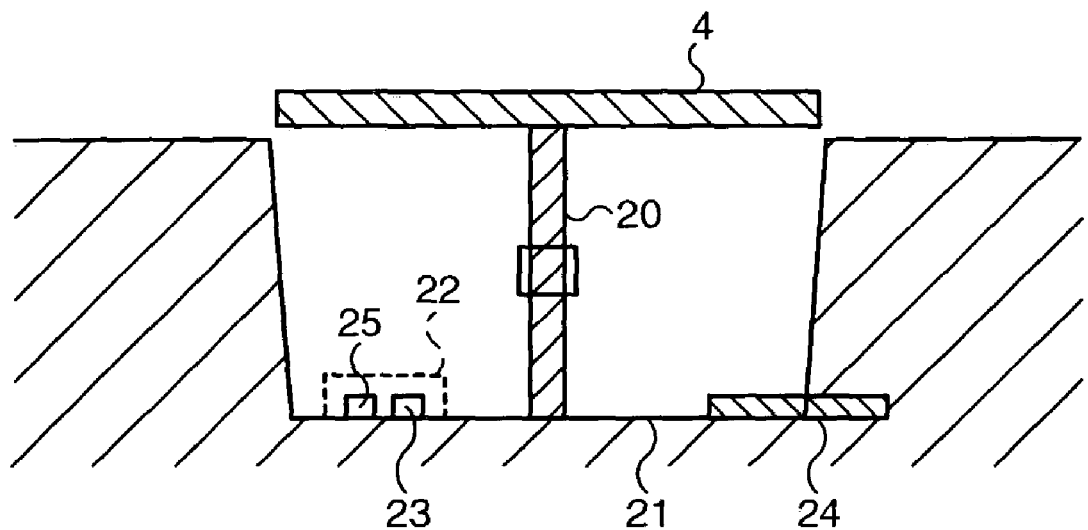
FIG. 3 shows a side view of the rotary dial in the embodiment of FIG. 2.

With reference to FIG. 3, the rotary dial mounted on its rotatable axis 20 is shown on the radiotelephone 1 in a cross sectional view. The rotary dial 4 is mounted so that it is perpendicular to its axis 20. The axis 20 is mounted so to allow freedom of movement in a clockwise or counter clockwise direction when a rotating force is applied to the attached rotary dial 4. The axis 20 is mounted on a PCB 21 within the radiotelephone 1 and is perpendicular to the PCB 21. Mounted on the PCB 21 and positioned below the rotary dial 4 is an infrared transmitter and receiver module 22. The infrared module 22 will output an infrared beam in the direction of the rotary dial 4 such that any reflected infrared may be received by the receiver portion 23 of the infrared module 22. The infrared module forming part of the electromagnetic encoder solution for the translation of movement into an analogue output representation. The skilled man will realise that other frequency beams including but not restricted to microwave frequencies could be used instead.

Figure 5:
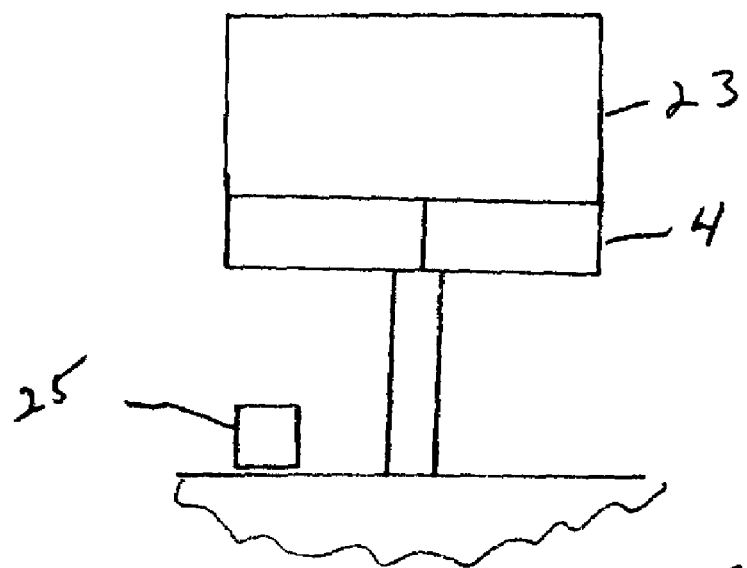
FIG. 5 is a side view an alternate embodiment where the detector is located for rotation with the rotatable member.
Figure 6:
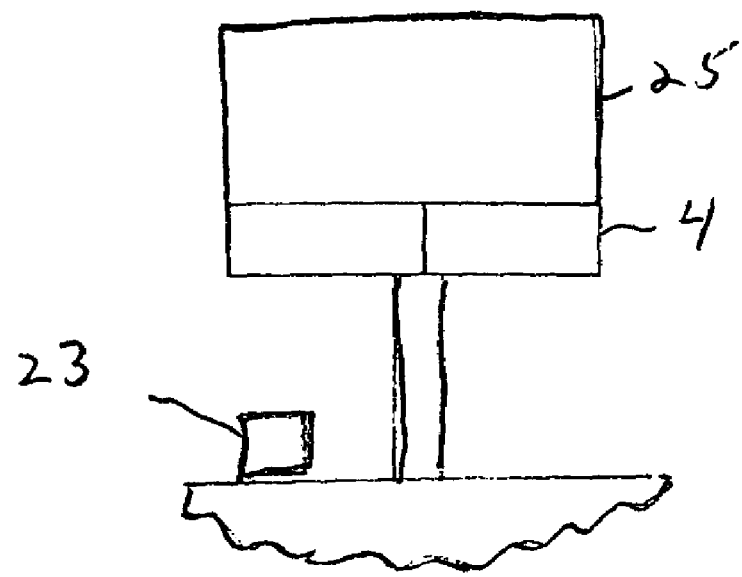
FIG. 6 is a side view an alternate embodiment where the source is located for rotation with the rotatable member.

The infrared module 22 includes the transmitting 25 and receiving portion 23 in a single package. This arrangement allows a single module solution to be used when using reflective surfaces to direct the infrared beam back towards the source; as illustrated in FIGS. 1–3, embodiments which do not use reflective surfaces, for example polarised surfaces, the transmitter and receiver modules may be placed at different positions on a PCB or on the same axis so as to permit line of sight reception. The receiving or transmitting module may also be placed on the rotating surface. Thus, the detector could be located for rotation with the rotatable member. An example of this is shown in FIG. 5 with detector 23 located for rotation with the rotatable member 4. Alternatively, as exemplified by FIG. 6, the source 25 could be located for roLat ion with the rotatable member 4.

The infrared module or detector 22 may be connected to processing circuitry 24 which may be placed anywhere within the radiotelephone 1 for the purpose of converting the amount of reflected infrared signal at the receiver portion 23 of the infrared module 22 into a suitable analogue signal which is proportional to the amount of the reflected infrared signal. As the rotary dial 4 is rotated the amount of reflected signal at the receiver portion 23 of the infrared module 22 will vary as the different reflective surfaces 11 pass above the infrared module 22; while a constant signal is being transmitted from the transmitter portion 25 of the infrared module 22. Processing circuitry 24 can then convert this into an analogue representation, preferably a voltage signal. In the illustrated embodiment the use of three different reflective surfaces 11 on the reverse side of the rotary dial 4 will result in three different voltages at the output of the processing module 24; where the highly reflective surface 12 results in a high voltage, the non-reflective surface results in a low voltage and the partially reflective surface results in a mid voltage between the high and low voltage. The order in which the reflective surfaces on the disc pass over the infrared module 22 will result in a particular voltage pattern occurring. For example, ascending voltages output by the processing circuitry 24, low voltage, mid voltage and high voltage would correspond to the rotary dial 4 being rotated in a clockwise direction. Descending voltages output by the processing circuitry 24, high voltage, mid voltage and low voltage would correspond to the rotary dial 4 being rotated in a counter clockwise direction.

The change in voltage pattern, which would be generated by more than two different reflective surfaces 11, allows the processing circuitry 24 to determine the direction of rotation of the rotary dial 4.

In an alternative embodiment the surface of the disc 10 may not be made up of reflective surfaces but could be made up of sectors of varying height where the amount of signal reflected by the surfaces is dependant upon its height above the electromagnetic module 22.

In another embodiment the surface of the disc 10 may be made up of polarised surfaces where the amount of reflected signal is dependant upon the polarisation of the transmitted signal and the polarisation of the surface upon which the transmitted signal is incident. With a polarised surface the transmitter and receiver portions of the infrared module may be placed at separate locations along the same axis as the surface may be partially transparent to infrared.

Given that a disc 10 comprising more than two surfaces and according to the method outlined will result in different voltage patterns depending upon the direction of rotation then the processing circuitry 24 may now be able to determine the direction of rotation on the rotary dial 4. This information may be translated by suitable further processing circuitry within the radiotelephone 1 for translating this movement into cursor movement on a LCD 2 or for browsing menu options on the LCD 2.

Figure 4:
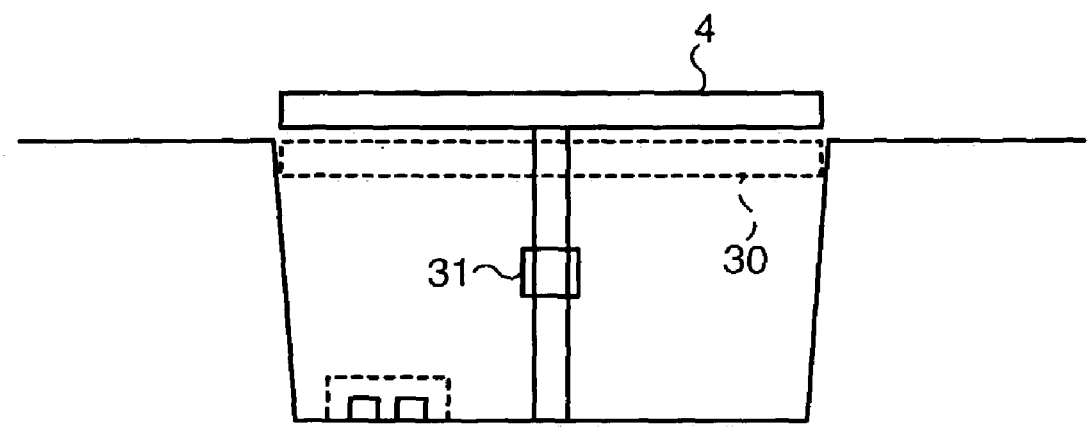
FIG. 4 shows a side view of the rotary dial in an embodiment where movement along an axis longitudinal to the axis of rotation is permissible.

With reference to FIG. 4, the rotary dial 4 may also be moved in a longitudinal direction e.g. depressed so as to activate a menu function once the menu choice has been highlighted by means of rotating the rotary dial. A user applying a force to the rotary dial may cause the dial to be de-pressed 30 activating a suitable sensor 31, which may correspond to the activation or selection of a menu option on the LCD 2.

The skilled man will understand that other modifications can be made within the scope of the invention. For example, the disc may allow the electromagnetic radiation to pass through and the different sectors may have different absorption characteristics as a result. For example, for an optical beam the sectors could have different respective opacities.

The present invention includes any novel feature or combination of features disclosed herein either explicitly or any generalisation thereof irrespective of whether or not it relates to the claimed invention or mitigates any or all of the problems addressed.

What is claimed is:

1. An apparatus comprising:
    a rotatable member;
    an element providing multiple sets of electromagnetic radiation transmissions, each set comprising a plurality of areas having respectively different electromagnetic radiation transmission characteristics for onward transmission of electromagnetic radiation, the areas being arranged to provide a directionally unique sequence of transmission characteristics along a path traced on rotation of the rotatable member, and wherein the sets form multiple repetitive sequences about the element;
    a source of electromagnetic radiation for directing the radiation towards the element;
    a detector for sensing the onward transmission of the electromagnetic radiation from the element,
    wherein the detector is located for rotation with the rotatable member.

2. An apparatus comprising:
    a rotatable member;
    an element providing multiple sets of electromagnetic radiation transmissions, each set comprising a plurality of areas having respectively different electromagnetic radiation transmission characteristics for onward transmission of electromagnetic radiation, the areas being arranged to provide a directionally unique sequence of transmission characteristics along a path traced on rotation of the rotatable member, and wherein the sets form multiple repetitive sequences about the element;
    a source of electromagnetic radiation for directing the radiation towards the element;
    a detector for sensing the onward transmission of the electromagnetic radiation from the element,
    wherein the source is located for rotation with the rotatable member.

3. An apparatus comprising:
    a source of electromagnetic radiation;
    a detector for sensing electromagnetic radiation; and
    a rotatable member located in a path between the source and the detector, wherein the rotatable member comprises multiple sets of electromagnetic radiation transmissions, each set comprising a plurality of electromagnetic radiation affecting surfaces having respectively different opacities to electromagnetic radiation for affecting transmission of electromagnetic radiation from the source to the detector into respective different amounts of electromagnetic radiation, wherein the surfaces are arranged to provide a directionally unique sequence of transmission characteristics along the path when the rotatable member is rotated, and wherein the sets form multiple repetitive sequences about the element.

4. An apparatus according to claim 1, wherein the plurality of areas have respectively different electromagnetic radiation transmission characteristics for onward transmission of different amounts of electromagnetic radiation, respectively.

5. An apparatus according to claim 1, wherein the areas comprise surfaces on the element.

6. An apparatus according to claim 1 wherein the characteristics are reflection characteristics.

7. An apparatus according to claim 1 wherein the areas comprise three different ones of the characteristics that are repeated in a same order on a surface of the element.

8. An apparatus according to claim 1 wherein the rotatable member is movable in an axis perpendicular to a plane of rotation of the rotatable member.

9. An apparatus according to claim 1 wherein the surfaces comprise different reflective surfaces.

10. An apparatus according to claim 1 wherein the surfaces comprise partially transparent surfaces.

11. An apparatus according to claim 1 wherein the areas comprise a substantially same size.

12. An apparatus according to claim 2, wherein the plurality of areas have respectively different electromagnetic radiation transmission characteristics for onward transmission of different amounts of electromagnetic radiation, respectively.

13. An apparatus according to claim 2, wherein the areas comprise surfaces on the element.

14. An apparatus according to claim 2 wherein the characteristics are reflection characteristics.

15. An apparatus according to claim 2 wherein the areas comprise three different ones of the characteristics that are repeated in a same order on a surface of the element.

16. An apparatus according to claim 2, wherein the rotatable member is movable in an axis perpendicular to a plane of rotation of the rotatable member.

17. An apparatus according to claim 2 wherein the surfaces comprise different reflective surfaces.

18. An apparatus according to claim 2 wherein the surfaces comprise partially transparent surfaces.

19. An apparatus according to claim 2 wherein the areas comprise a substantially same size.

20. An apparatus according to claim 3 wherein the areas comprise three different ones of the characteristics that are repeated in a same order on a surface of the element.

21. An apparatus according to claim 3 wherein the rotatable member is movable in an axis perpendicular to a plane of rotation of the rotatable member.

22. An apparatus according to claim 3 wherein the areas comprise a substantially same size.

23. A mobile communications device comprising a display and an apparatus as in claim 1, wherein the rotatable member is rotatable, in use, by a user, to provide a user input.

24. A mobile communications device as in claim 23 wherein the rotatable member is located on the front face of the device.

* * * * *